(No Model.)
A. C. ESTABROOK.
DIE FOR MANUFACTURE OF MOLDED ARTICLES.
No. 537,187. Patented Apr. 9, 1895.
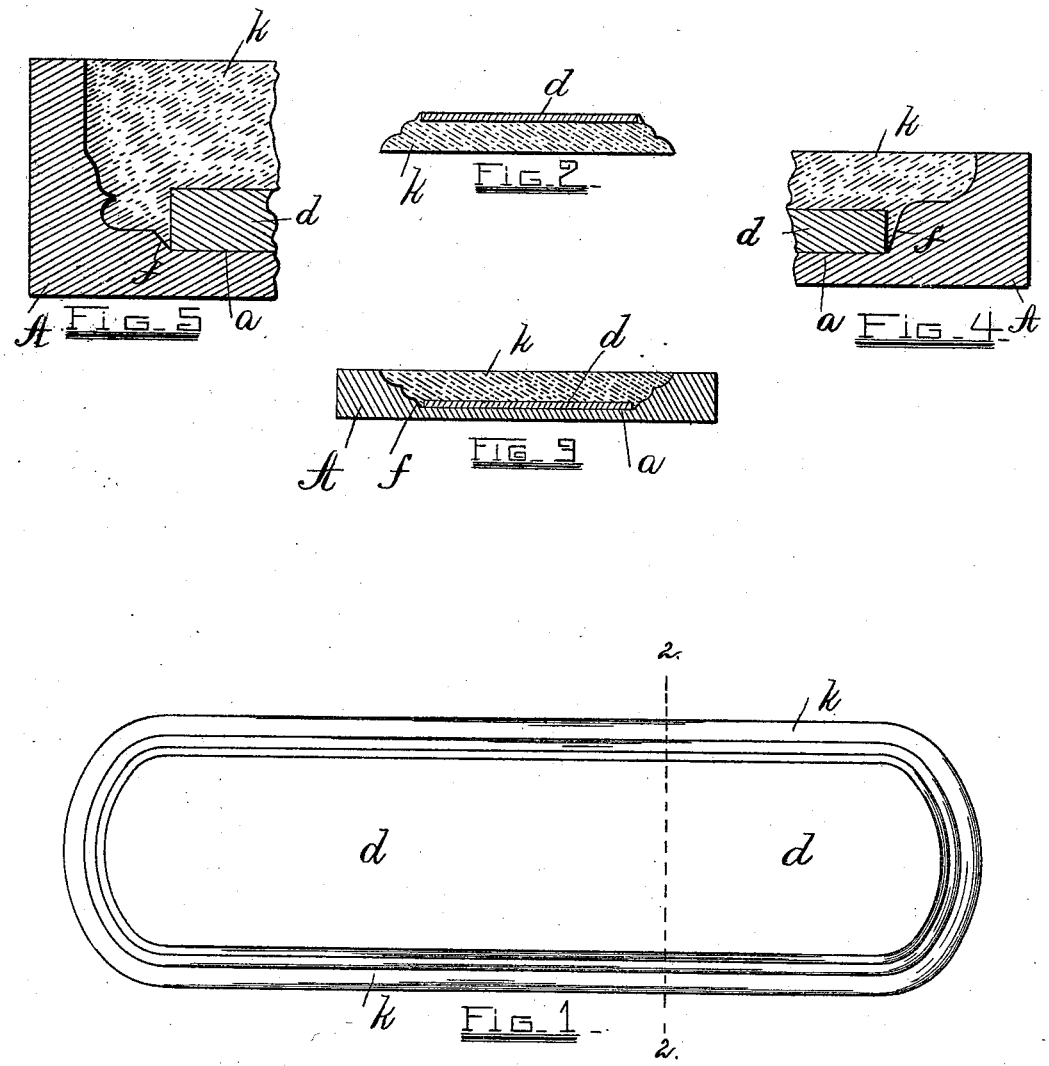

UNITED STATES PATENT OFFICE.

ALANSON C. ESTABROOK, OF NORTHAMPTON, MASSACHUSETTS, ASSIGNOR TO THE FLORENCE MANUFACTURING COMPANY, OF SAME PLACE.

DIE FOR MANUFACTURE OF MOLDED ARTICLES.

SPECIFICATION forming part of Letters Patent No. 537,187, dated April 9, 1895.

Application filed April 1, 1892. Serial No. 427,319. (No model.)

*To all whom it may concern:*

Be it known that I, ALANSON C. ESTABROOK, a citizen of the United States, residing at Northampton, in the county of Hampshire and State of Massachusetts, have invented certain new and useful Improvements in Dies for the Manufacture of Molded Articles, of which the following is a specification, reference being had therein to the accompanying drawings.
In the manufacture of molded articles, as brush and mirror backs, paper weights and the like, which are made from plastic composition which is molded to shape in dies, it is often desirable to provide the article which is molded with a panel or piece of material which is of a different character for the purpose either of producing an ornamental effect, or for reducing the cost of the article by replacing a part of the composition employed by the material of the panel and which may be less expensive than the plastic composition or for the purposes of advertising or the like. Some of these objects are inefficiently attained by securing, by the use of adhesive material, a piece of paper or similar thin layer to the surface of the article which is molded. This does not attain the object desired and does not afford, so far as known to me, a neat, durable and desirable panel. It is also deemed objectionable to secure a panel by means of pins or similar devices inasmuch as the face of the panel is injured or marred by the use of such devices, and at the same time it is desirable that the panel should be properly centered in that part of the article which is designed to receive it.

My invention has for its object to obviate the difficulties encountered in the manufacture of such articles made from plastic composition, and to provide a die by the employment of which a molded article which shall be free from the above defects may be made, and it consists in a die provided with a space, corresponding in size and shape to the panel, which is to be inserted in the article, the walls of the die adjacent the said space being made flaring or beveling all as hereinafter set forth.

In the drawings accompanying this specification, I have shown at Figure 1 a plan view of a brush back having a panel secured thereto. Fig. 2 is a section on line 2—2 Fig. 1. Fig. 3 is a similar section of the metal die in which the brush back is molded showing the composition and the panel in place therein. Figs. 4 and 5 are enlarged details, broken away, showing dies of different forms.

A represents a die, the concavity in which corresponds to the shape of the article which is to be molded. The portion of the die which is designed to receive the panel is shown at *a* and this portion should correspond accurately in size and shape with the panel which is to be inserted in, or secured to, the article. The panel is shown at *d*. The panel is preferably of substantial thickness in order that it may be firmly held by the composition, *k*. The sides or walls *f* of the die adjacent the part *a* thereof, are inclined, or made beveling, so that any horizontal section of the cavity of the die above the bottom or portion *a* thereof will be larger in area than said portion *a*. This construction of the die permits the plastic composition *k* to flow, or be pressed, into the space between the edge of the panel and the flaring sides or walls *f* so that in the molded article the panel will be protected around its edge, and up to its exposed surface, by the composition, while at the same time, since the panel *d* fits the bottom portion *a* of the die, it will not be displaced when the composition is pressed into the die. These features of the die will be clear upon reference to Figs. 4 and 5 of the drawings.

If the flat bottom *a* of the die were larger than the panel the placing of the composition in the die, and the pressure applied thereto, would be apt to displace the panel and in the finished article the panel would not be in its proper position, but would be out of the center of the space which it is designed to occupy.

As will be clear the essential features of the die are the portion *a*, corresponding in size to the panel to be used, and the beveling or inclined side-walls *f* adjacent the said portion *a*.

By the employment of a die of this construction, a molded article may be provided with a panel which may be accurately placed in the article without the use of securing pins, or similar devices, which mar or puncture the face of the panel. A panel may be employed of relatively great thickness, the concealed portions of the panel being of cheap material which will displace a corresponding bulk of composition and thus reduce the cost of the article without impairing its value or efficiency and the work of manufacturing paneled articles may be easily and cheaply performed.

What I claim is—

A die for the manufacture of molded articles, having, below the general cavity for the reception of plastic material, a panel-receiving depression shaped at its borders to correspond with the contour of the edges of the panel, with the walls or sides of such depression inclined or beveled outward for the reception of a portion of the plastic material around the edges only of the panel, said walls or sides constituting shoulders around the depression to engage with the edges of the panel and thereby fix the latter in precise position, substantially as described.

In testimony whereof I affix my signature in presence of two witnesses.

ALANSON C. ESTABROOK.

Witnesses:
  L. N. BAKER,
  A. C. LANEY.